(12) United States Patent
Wuensch et al.

(10) Patent No.: US 6,810,782 B2
(45) Date of Patent: Nov. 2, 2004

(54) DETACHABLE TOOL FIXING MECHANISM AND TOOL FOR USE THEREWITH

(75) Inventors: Steffen Wuensch, Holzgerlingen (DE); Harald Krondorfer, Ludwigsburg (DE); Mather John Carr, Cambridge (GB); Anne Tregoning Miller, Cambridge (GB); Neil Pollock, Hertz (GB); Hans Kaiser, Leuzigen (CH); Daniel Saegesser, Langenthal (CH); Daniel Grolimund, Zuchwil (CH)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 10/296,701

(22) PCT Filed: Mar. 19, 2002

(86) PCT No.: PCT/DE02/00980

§ 371 (c)(1),
(2), (4) Date: Nov. 26, 2002

(87) PCT Pub. No.: WO02/081135

PCT Pub. Date: Oct. 17, 2002

(65) Prior Publication Data

US 2003/0106407 A1 Jun. 12, 2003

(30) Foreign Application Priority Data

Apr. 4, 2001 (GB) .............................................. 0108495

(51) Int. Cl.$^7$ ........................ B27B 19/02; B23B 31/107
(52) U.S. Cl. ........................ 83/699.21; 30/392; 30/337; 30/339; 279/87; 279/102
(58) Field of Search .............................. 83/697, 698.11, 83/698.31, 698.71, 699.21, 954; 30/392, 399, 336, 338, 342, 339, 337, 523, 524, 394, 393; 279/76, 77, 87, 102, 904, 24, 28, 29, 79, 86, 97, 155, 81, 71, 907; 81/177.1, 184, 16, 489, 487; 600/177, 178, 179, 176, 82, 522; 403/324, 328–329

(56) References Cited

U.S. PATENT DOCUMENTS 416,594 A * 12/1889 Goddard ...................... 81/489

(List continued on next page.)

FOREIGN PATENT DOCUMENTS

DE   00 05 767 U   6/1988

(List continued on next page.)

OTHER PUBLICATIONS

Patent Abstracts of Japan vol. 015,No. 378 (M–1161) Sep. 24, 1991 & JP 03 151201 A, Jun. 27, 1991.
Patent Abstracts of Japan vol. 1996, No. 10 Oct. 31, 1996 & JP 08 155904 A, Jun. 18,1996.

*Primary Examiner*—Boyer D. Ashley
(74) *Attorney, Agent, or Firm*—Michael J. Striker

(57) ABSTRACT

A tool fastening mechanism has a housing 2, in which a clamping opening 3 is embodied for receiving a tapering tool shaft clamping end 4 of a tool part 5. The clamping opening 3 tapers inward in the introduction direction of the clamping end 4 of a tool part 5, and furthermore the tapering sides are inclined toward one another in a plane extending perpendicular to the introduction direction, as a result of which the opening has a trapezoidal cross section, and the length of this cross section decreases away from the orifice of the clamping opening 3. The housing 2 furthermore has a transverse opening 7, which intersects the clamping opening 3 and in which a locking pin 8 is received. Upon introduction of a tool into the fastening mechanism, a tapering edge 20 of the pin 8 comes into engagement with a front edge 21 of an oblong hole 9, embodied in the clamping edge 4 of the tool part 5, and the resultant engagement action draws the clamping end 4 deeper into the clamping opening 3, while the pin 8 is driven farther into the transverse opening 7. The combination of the double tapering of the clamping opening 3 and the longitudinal locking accomplished by the locking pin 8 makes it possible to effectively restrict all six degrees of freedom of the tool part, within the production tolerances attainable by conventional mass-production methods.

21 Claims, 2 Drawing Sheets

U.S. PATENT DOCUMENTS

| | | | | | |
|---|---|---|---|---|---|
| 1,273,025 | A | * | 7/1918 | Brongel | 42/53 |
| 1,388,931 | A | * | 8/1921 | Celler | 30/123 |
| 2,137,800 | A | | 11/1938 | Davey | |
| 2,639,158 | A | * | 5/1953 | Procos | 279/77 |
| 3,259,158 | A | | 7/1966 | Frank | |
| 4,106,181 | A | * | 8/1978 | Mattchen | 29/450 |
| 5,209,054 | A | * | 5/1993 | Lawson | 56/300 |
| 5,324,052 | A | * | 6/1994 | Ortmann | 279/83 |
| 5,458,346 | A | * | 10/1995 | Briggs | 279/97 |
| 5,810,367 | A | | 9/1998 | Holzer | |
| 5,916,218 | A | * | 6/1999 | Hagen et al. | 606/82 |
| 5,987,758 | A | | 11/1999 | McCurry et al. | |
| 6,009,627 | A | * | 1/2000 | Dassoulas et al. | 30/392 |
| 6,112,420 | A | * | 9/2000 | Schickerling | 30/392 |
| 6,209,208 | B1 | | 4/2001 | Neitzell | |
| 6,260,281 | B1 | * | 7/2001 | Okumura et al. | 30/392 |
| 6,467,177 | B2 | * | 10/2002 | Eichberger | 30/392 |

FOREIGN PATENT DOCUMENTS

| | | |
|---|---|---|
| DE | 195 32 494 A | 3/1997 |
| EP | 0 940 210 A | 9/1999 |
| EP | 1 053 813 A | 11/2000 |

* cited by examiner

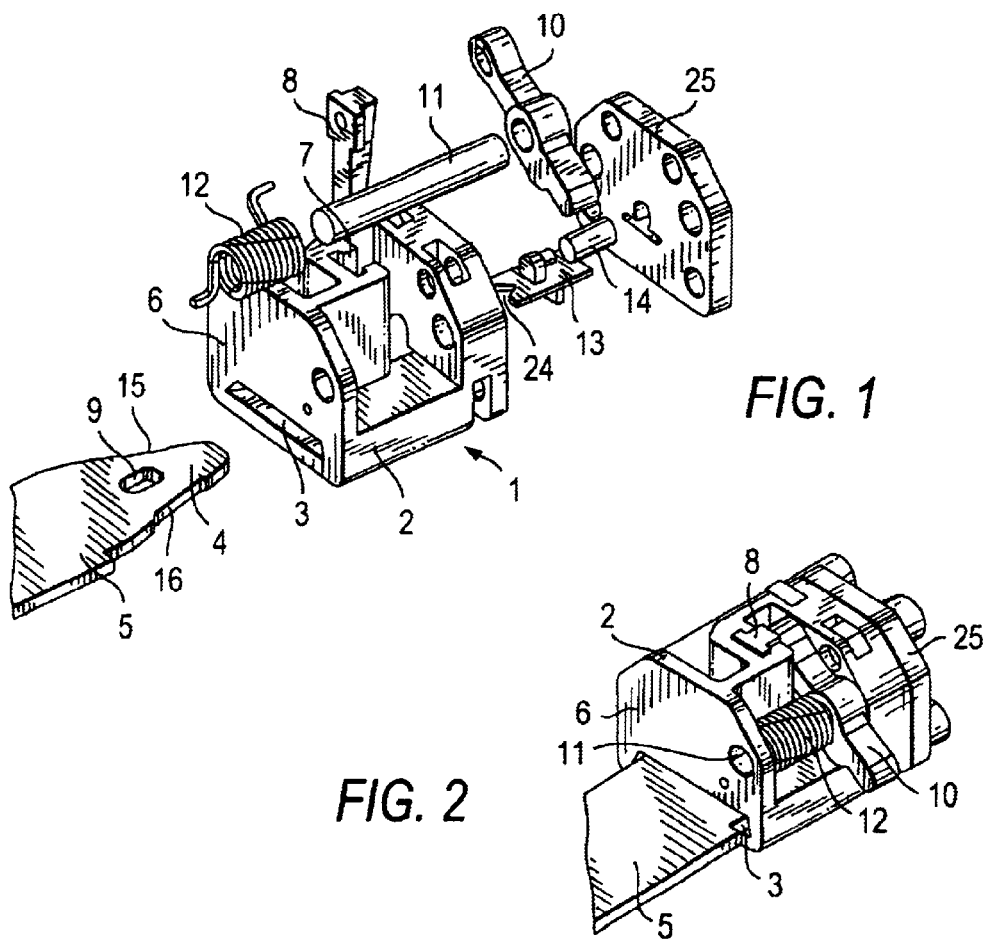
FIG. 1
FIG. 2
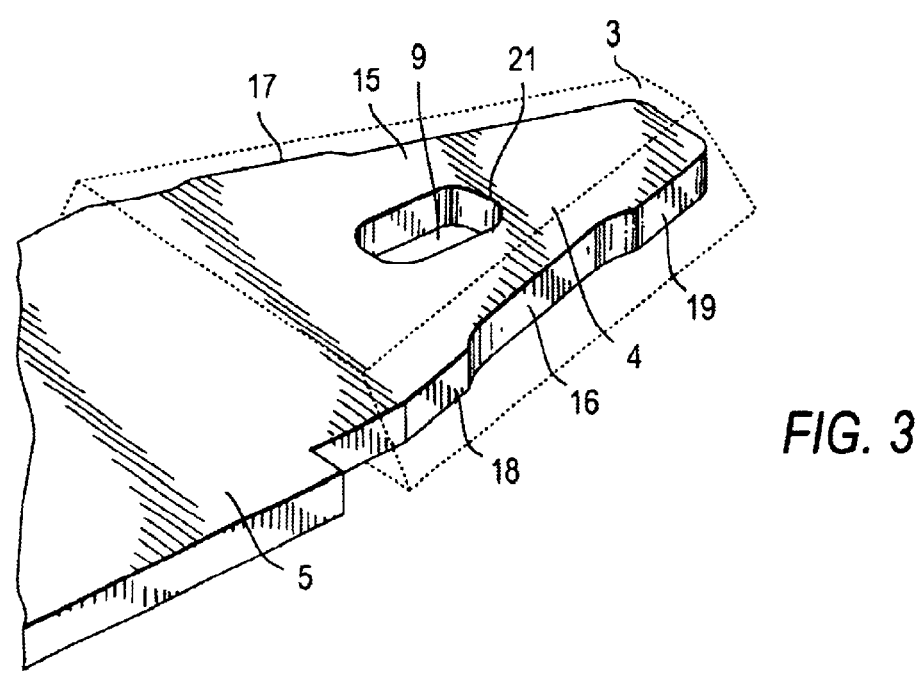
FIG. 3

DETACHABLE TOOL FIXING MECHANISM AND TOOL FOR USE THEREWITH

BACKGROUND OF THE INVENTION

The present invention relates to releasable tool fastening systems to tools for use with them.

Saber saws are reciprocating power saws that are often used for work to break things off and for rough cutting applications, and it is known in the prior art in such saws to use a fast-change blade clamping system, so that when necessary, a blade can be changed quickly and easily. In known blade clamping arrangements, an interaction as a rule occurs between curved faces, ball bearings, and inclined planes for firmly clamping a standard saw blade shaft. As a rule, the blade is firmly held by the engagement of a peg bearing or ball bearing with a through hole embodied in the blade shaft, to counteract longitudinal stresses when the flat surface of the blade shaft is firmly clamped. Although these known systems work to restrict one degree of freedom of a saw blade, as a rule they are based on the mechanical attachment of the blade in a slot in the fastening mechanism, in order to restrict the remaining degrees of freedom, and this is highly dependent on the production tolerances that can be attained. In practice with these known systems, a certain degree of undesired play of the blade then occurs.

SUMMARY OF THE INVENTION

In one aspect of the present invention, a tool fastening mechanism having the following elements is furnished: a housing, which has a clamping opening for receiving the shaft of a tool to be fastened, wherein the clamping opening tapers downward in a first direction, in which in use a tool shaft is introduced into the clamping opening, and which also tapers in a second direction extending perpendicular to the first direction, having an opening in the housing which intersects the clamping opening, and having a locking pin, which is movable in the opening between a first position, in which it is retracted from the clamping opening, so that in use it allows a tool shaft to be introduced into and removed from the clamping opening, and a second position, in which it protrudes into the clamping opening, so that in use it takes the tool shaft into engagement, in order to prevent the shaft from being pulled out of the opening, and wherein upon introduction of a tool shaft into the opening in use, the tapering of the opening in the first direction restricts a motion of the shaft in a third direction extending perpendicular to the first and second directions; this tapering of the opening in the second direction lends the shaft an engagement action and presses it against one side of the opening, in order to restrict a motion in the second direction, and engagement of the locking pin with the shaft restricts a motion in the first direction, as a result of which all six degrees of freedom of the tool shaft are restricted.

The present invention also furnishes a tool for use with a fastening mechanism of the invention, which has a shaft whose sides taper inward toward the clamping end and also has an engagement face, embodied on the tapering shaft part, which face is engaged in use by a locking pin of the fastening mechanism.

A system comprising a tool fastening mechanism and a tool for use with it has the advantage that the system, because of the fact that the converging sides of the clamping opening are inclined in the transverse plane to one another, creating a double taper in the opening, counteracts all six degrees of freedom of an introduced blade within the production tolerances that are attainable by conventional mass-production methods that are used in systems of the prior art, which as explained above are not capable of completely restricting the tool without excessive mechanical play. If the taper of the clamping opening extends symmetrically, the system furthermore permits bidirectional fastening, so that a tool, such as a saber saw blade, can be secured with the teeth pointing either upward or downward, thus enhancing the versatility of the tool, and the disposition of the locking pin makes it possible to load a tool into the clamping device without first having to maneuver the tool over fixed positioning pins, thus making it simpler to use. The frictional engagement of the locking pin also means that the only imaginable way in which a tool could be released by mistake from the saw during use would be a sudden complete failure of the fastening mechanism or of the tool shaft.

Moreover, the embodiment of the tool shaft, in comparison with that known from the prior art, enables improved strength, and the increased torsional and flexural strength that is thus possible in the shaft allows narrower cutting radii. In particular, because of the tapering design of the clamping opening and of the tool shaft, the tool cross section is maximized at the place where it meets the tool body, which in use is equivalent to the region of maximum bending stress, thus improving the overall strength of the blade in comparison to the prior art versions. In the prior art versions, a graduated change of cross section has been necessary as a rule at the transition between the tool shaft and the tool body, which increases the likelihood of a fatigue fracture caused by stress concentrations at the change in cross section.

Preferably a hole is embodied in the tool shaft, and the locking pin extends through it, to prevent the tool shaft from being pulled out of the clamping opening; the front edge of the hole forms the locking pin engagement face of the tool shaft. This has the advantage that the compulsory longitudinal force can be applied to the tool shaft in a balanced way, so that the shaft can be rotated in proper engagement with the clamping opening. As an alternative to this, the tool shaft could be embodied in at least one side of it with a notch or a recess, with the notch having a side face where the pin can engage it, to prevent the shaft from thus being pulled out of the clamping opening.

In the preferred embodiment, the locking pin has a tapering portion, which cooperates with the front edge of the hole or with the side notch in the introduced tool shaft in such a way that as the locking pin is pressed further into the clamping opening, the engagement action resulting from the taper on the locking pin draws the shaft deeper into the clamping opening. This has the advantage that the tool can be clamped very firmly in the opening, without the user having to exert excessive force by the tool itself, which for fragile tools such as saw blades could cause them to break. The cone angle of the tapering portion of the locking pin is preferably less than $\tan^{-1}(2\mu)$, and $\mu$ is equal to the coefficient of static friction for the specified contact faces, which assures that the locking pin by frictional engagement acts counter to stresses exerted along the axis of the tool part.

In the preferred embodiment, action is exerted on the locking pin by a prestressing means, which moves it into the clamping opening with sufficient force to assure that the engagement action between the tapering part of the locking pin and the blade shaft brings about proper fastening of the tool. Once the locking pin is engaged, it is effectively held firmly by static friction, so that the prestressing means cannot be overcome by stresses exerted on the blade. A release mechanism is then provided, which is activated by the user in order to retract the locking pin from the opening, counter to the stress exerted by the prestressing means, in order to release a tool secured in the mechanism. This can be achieved especially effectively whenever the end of the locking pin remote from the opening is connected to a release lever, which is mounted pivotably on the housing, so that the pivoting of the release lever effects a motion of the locking pin between its first and second positions. The prestressing means can then be embodied as a torsion spring, which is in engagement with the release lever and presses it into a position in which the lever presses the locking pin into the clamping opening. This has the advantage that an especially simple yet effective retaining and release system for the locking pin is thus furnished.

The mechanism furthermore advantageously includes a blade ejection system, in the form of a carriage, which is mounted in the clamping opening for executing a limited longitudinal displacement therein and is prestressed toward the orifice of the opening, for instance by a compression spring, so that the tip upon introduction of a shaft into the opening takes the carriage into engagement and pushes it toward the rear part of the opening, counter to the stress from the compression spring. Upon release of the shaft from the opening by actuation of the release lever, the compression spring then pushes the carriage toward the front, as a result of which the shaft is pushed out of the orifice of the opening. The forward position of the carriage is preferably then disposed such that it is located above the intersection between the locking pin opening and the clamping opening; the locking pin, on its front edge toward the carriage, is provided with cutouts that enter into engagement with a V-shaped notch in the carriage, to assure a proper engagement between the two parts. In this way, when the tool is pulled out of the opening, the mechanism automatically locks the locking pin in its first position, thus allowing a new tool to be introduced without the user having to use the release lever to release the locking pin from the clamping opening. This makes it possible to load a tool into the mechanism and remove it again with only one hand, which is especially advantageous, since it enables a user to remove a hot tool part without the risk of burning himself.

Preferably, the hole in the shaft of the tool is oblong in its introduction direction into the clamping opening, in order to take appropriate account of the various thicknesses of the locking pin, because of the tapering portion embodied on it. This has the advantage that the locking pin can be moved forward without reducing the cross-sectional area of the tool shaft. Moreover, the cross-sectional area of the locking pin can be increased without excessively weakening the tool shaft.

It is also especially advantageous if three protrusions are embodied on the converging sides of the tool shaft, at least one of which is provided on each of the two sides. This has the advantage that because of the resultant contact between the tool shaft and the sides of the opening, it is assured that the reaction forces exerted will be determined statically, creating an especially stable fastening of the shaft without play, and this fastening itself takes appropriate account of normal production tolerances. As an alternative, the protrusions can be provided on the converging walls of the clamping opening, instead of on the sides of the shaft, to obtain the same statically determined reaction forces, although the production of the resultant mechanism will be more expensive, and a bidirectional fastening might not be possible.

For good comprehension of the invention, several exemplary embodiments of the invention will now be described in conjunction with the accompanying drawings.

BRIEF DESCRIPTION OF THE DRAWINGS

FIG. 1, an exploded view of a tool fastening mechanism of the invention;

FIG. 2, a perspective view of the mechanism of FIG. 1, with the tool shaft introduced;

FIG. 3, a perspective view of a tool shaft of the invention, showing a tool shaft clamping opening of the fastening mechanism in outline;

DESCRIPTION OF THE PREFERRED EMBODIMENTS

Figure 4:
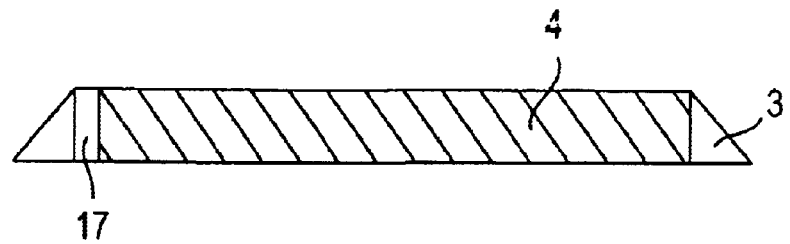
FIG. 4, a sectional view through the tool shaft clamping opening with a tool shaft introduced into it.

First, turning to FIG. 1, an exploded view of a preferred embodiment of a tool fastening mechanism 1 of the invention is shown. What is shown is an embodiment of a saw blade shaft, but it is understood that the invention can be used in many different kinds of replaceable tools. The fastening mechanism 1 comprises a housing 2, in which a blade opening 3 is embodied for receiving the shaft 4 of a saw blade 5, such as a saber saw blade, that is to be firmly clamped; the blade opening 3 begins on one side of the housing 2 and extends longitudinally through the housing to the opposite side thereof, where it tapers inward, so that the width of the blade opening decreases in its course away from the one side 6, as can be seen better in FIGS. 3 and 5. Besides the taper in the longitudinal direction, the converging sides of the opening are inclined toward one another, so that the blade opening also tapers in the direction extending perpendicular to the plane of the introduced blade shaft 4; as a consequence, the top side of the blade opening is narrower than the underside of the blade opening, as FIG. 5 clearly shows.

In the housing 2, an opening 7 is made which intersects the plane of the blade opening and extends through it, and in which a locking pin 8 is received. The locking pin 8 is movable along the opening 7 between a locking position, in which it extends into the blade opening 3, so that in use it engages a hole 9 embodied in the shaft 4, introduced into the blade opening, of a saw blade 5 in order to lock it in the blade opening 3 in the manner shown in FIG. 5, and a release position, in which the pin is retracted from the blade opening 3, so that a blade shaft can be introduced unhindered into and removed from the blade opening 3. As better shown in FIGS. 5 and 6, the locking pin 8 has a tapering portion 20, which enters into engagement with one end 21 of the hole 9 in the blade shaft, so that as the pin 8 is pushed farther into the hole 9, the resultant engagement action draws the shaft 4 of the saw blade 5 deeper into the blade opening 3, as explained hereinafter. The locking pin 8 also has one recess 23 cut into each of the two sides on its lower end, of which one recess can be seen in FIG. 6; these recesses cooperate with a V-shaped notch 24, embodied in the front side of a tripping mechanism 13, so as to lock the pin 8 in a release position, as will be described later.

On its upper end, the locking pin 8 is connected to one end of a release lever 10 mounted pivotably on a shaft 11. The shaft 11 is mounted in turn in the housing, so that a pivoting motion of the release lever 10 about the shaft causes a motion of the locking pin between its locking position and its release position. A torsion spring 12 is also mounted on the shaft 11 and takes the release lever into engagement and prestresses it into a first rotary position, in which the locking pin 8 is in its locking position. The locking pin 8 is therefore prestressed into its locking position, but it can be retracted from it by actuation of the release lever 10 counter to the prestressing of the torsion spring 12.

The tripping mechanism 13 is mounted displaceably in the end of the blade opening 3 remote from the side 6 of the housing. The tripping mechanism 13 is prestressed by a trip spring 14 toward the front end of the blade opening 3 into a blocking position, in which it is located above the intersection of the opening 7 and the blade opening 3; its V-shaped notch 24, visible in FIG. 1, engages the recesses 23 embodied in both sides of the locking pin 8, in order to lock the locking pin 8 in its release position, counter to the load exerted by the torsion spring 12. When the blade shaft 4 is introduced into the blade opening 3, the tripping mechanism 13 is moved away from the orifice of the blade opening 3, counter to the load exerted by the trip spring 14, so that the locking pin 8 can engage the hole 9 in the blade shaft 4. A carrier plate 25 is secured to the back side of the housing 2, in order to firmly hold the tripping mechanism 13, the trip spring 14, and the shaft 11 therein.

Figure 5:
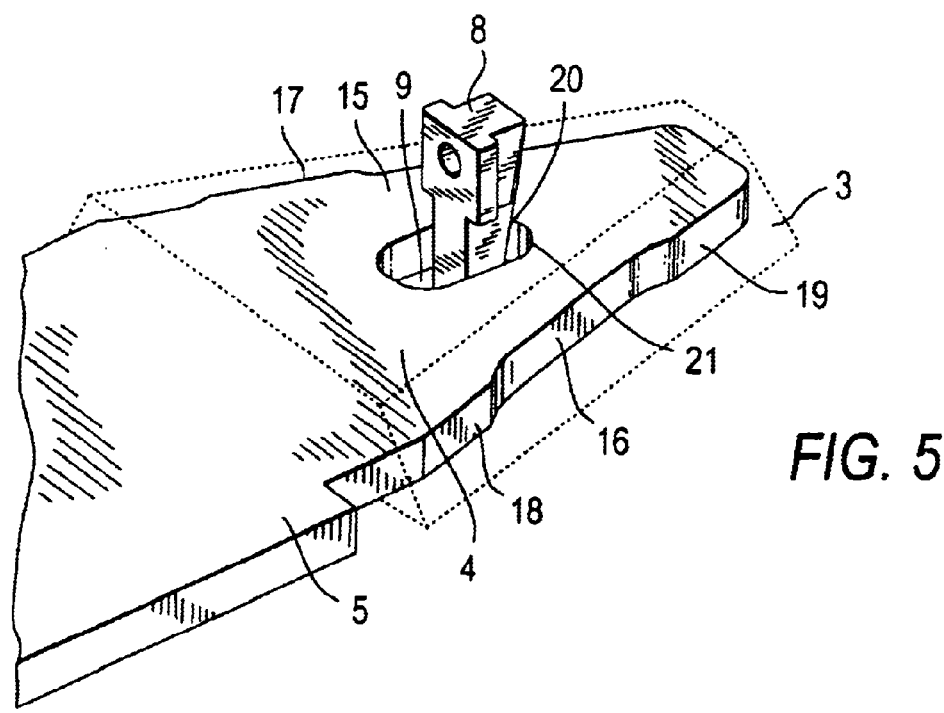
FIG. 5, a perspective view of the tool shaft, introduced into the tool shaft clamping opening, similar to FIG. 3, showing the way in which the locking pin engages a hole in the tool shaft.
Figure 6:
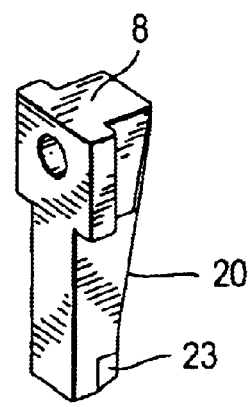
FIG. 6, a perspective view of the locking pin that forms part of the fastening mechanism of FIG. 1.

The sides 15, 16 of the blade shaft 4 also taper inward longitudinally to supplement the longitudinal taper of the blade opening 3, and as FIGS. 3 and 5 clearly show, they include, distributed among the converging sides, three protrusions 17, 18, 19, which are distributed around the profile of the blade shaft and enter into engagement with the tapering sides of the blade opening 3, in order to establish a contact at six points between the blade shaft and the blade opening 3. This kind of contact at six points assures that the reactions exerted are statically determined, which assures maximum stability for the firmly clamped blade.

The fastening mechanism functions as follows:

When there is no blade in the blade opening 3, the trip spring 14 pushes the tripping mechanism 13 forward, in order to lock the locking pin in its release position, which enables unhindered introduction of a blade shaft into the clamping opening 3. When a blade shaft 4 is introduced into the blade opening 3, the end of the shaft takes the tripping mechanism 13 into engagement and pushes it, counter to the force of the trip spring 14, back toward the carrier plate 25, until the locking pin is unlocked and, under the load exerted by the torsion spring 12, engages the hole 9 in the blade shaft 4. As the locking pin 8 is pressed further through the hole 9 in the shaft 4 by the torsion spring, the taper on the front edge of the locking pin 8 engages the front edge of the hole 9, and because of the resultant engagement action the shaft 4 is thrust farther into the blade opening 3. While under the engagement action of the locking pin 8 the blade shaft 4 advances into the final engagement, it can rotate in the plane of the opening 3, so that the three protrusions 17, 18, 19 come to rest on the walls of the opening, thereby assuring a proper orientation of the blade shaft in the blade opening 3. At the same time, by the engagement action caused by the engagement of the protrusions 17, 18, 19 on the shaft 4 with the vertical taper of the converging sides of the blade opening 3, the blade shaft 4 is pressed against the underside of the opening 3. As a consequence, the blade shaft is restricted by six main contact points, which are located in pairs, one pair on each of the three protrusions 17, 18, 19, on the blade shaft 4, and it is firmly held by the locking pin 8. The magnitude of the reaction forces between the blade shaft 4 and the blade opening 3 depends directly on the spring prestressing exerted by the torsion spring 12 and on its spring constant and can therefore easily be adjusted to the suitable level for the type of blade to be used. However, it is also important that the prestressing of the torsion spring be greater than that of the trip spring 14, to assure that the blade shaft will be pressed firmly into the blade opening 3.

To release the blade, the user rotates the release lever 10 about the shaft 11, counter to the force of the torsion spring 12, so that the locking pin 8 is retracted out of the hole 9 in the blade shaft 4 far enough that the load on the front edge of the hole 9 exerted by the taper on the front edge of the locking pin 8 is eliminated. Once the load is eliminated, the tension in the trip spring 14 causes the tripping mechanism to move to its blocking position, and as a result the blade shaft 4 is simultaneously expelled from the clamping opening 3, and the locking pin 8 is again locked in its release position, as described above, and is ready to receive a new blade.

Instead of a pin with a tapering edge, the locking pin 8 can be a standard type of pin that merely functions so as to prevent retraction of the blade shaft from the opening 3, without exerting an engagement action, in order to draw the blade shaft farther into the opening. In that case, the user must instead introduce the blade far enough into the opening to assure that the pin 8 is positioned properly in the hole 9; the position of the hole then determines the position in which the shaft is firmly held in the opening 3 and thus determines the extent of mechanical play of the shaft in the opening 3. Without a taper on the locking pin, however, this embodiment could still have excessive mechanical play, which is typically the case in systems in the prior art. Instead of embodying the three protrusions 17, 18, 19 on the edges of the blade shaft 4, they can be embodied in the tapering walls of the opening, although in that case it might no longer be possible to achieve a bidirectional fastening of the blade.

In an embodiment of the invention not shown, the hole 9 in the shaft 4 is replaced by a notch, cut into a tapering side 16 of the shaft 4, that has an oblique face oriented laterally, which the locking pin 8 can engage in order to restrict the longitudinal motion of the shaft 4 in the clamping opening 3. To assure that a torsionally balanced load will be exerted by the locking pin, a notch of this kind can also be embodied in every tapering side of the shaft 4, and then the fastening mechanism can be provided with a pair of locking pins, of which one locking pin in each pair is assigned to a respective notch.

Although the invention has been described above in conjunction with saber saws, it is understood that it can also be used with other types of saw, such as jig saws, or even other types of tool that have changeable/replaceable tool parts, such as files and the like.

What is claimed is:

1. A tool fastening mechanism having a housing, which has a clamping opening for receiving a shaft of a tool to be fastened, wherein the clamping opening tapers downward in a first direction, in which in use the tool shaft is introduced into the clamping opening, and which also tapers in a second direction extending perpendicular to the first direction, having an opening in the housing which intersects the clamping opening, and having a locking pin, which is movable in the opening between a first position, in which it is retracted out of the clamping opening, so that in use it allows the tool shaft to be introduced into and removed from the clamping opening, and a second position, in which it protrudes into the clamping opening, so that in use it takes the tool shaft into engagement, in order to prevent the shaft from being pulled out of the opening, and wherein upon introduction of the tool shaft into the opening in use, the tapering of the opening in the first direction restricts a motion of the shaft in a third direction extending perpendicular to the first and second directions, which tapering of the opening in the second direction lends the shaft an engagement action and presses it against one side of the opening, in order to restrict a motion In the second direction, and engagement of the locking pin with the shaft restricts a motion in the first direction, as a result of which all six degrees of freedom of the tool shaft are restricted.

2. The tool fastening mechanism of claim 1, in which the locking pin has a tapering portion, with which in use it takes an edge, embodied on the tool shaft introduced into the clamping opening, into engagement, and as the looking pin is pressed farther into a tool hole, the resultant engagement action between the tapering portion and the edge draws the shaft deeper into the clamping opening.

3. The tool fastening mechanism of claim 2, in which a cone angle of the tapering portion of the locking pin is less than $\tan^{-1}(2\mu)$, end $\mu$ is equal to the coefficient of static friction for specified contact feces.

4. The tool fastening mechanism of claim 1, further having a prestressing means, which prestresses the locking pin into the second position.

5. The tool fastening mechanism of claim 1, further having a release lever, connected to the locking pin, that can be actuated so as to move the locking pin between its first and its second position.

6. The tool fastening mechanism of claim 5, in which the release lever is mounted pivotably on the housing.

7. The tool fastening mechanism of claim 6, further having a torsion spring, connected to the release lever, that prestresses the lever into a position in which the locking pin is in its first position.

8. The tool fastening mechanism of claim 7, in which the torsion spring and the release lever are mounted on the housing on a common shaft.

9. The tool fastening mechanism of claim 1, further having a tripping mechanism, disposed displaceably at the clamping opening, which is prestressed by a prestressing means into a forward position in the opening and which in use is taken into engagement by a front end of a tool shaft introduced into the opening and is moved rearward counter to a loading by a prestressing means, and the loading by the prestressing means forces the shaft out of the opening.

10. The tool fastening mechanism of claim 9, in which the tripping mechanism in its forward position is located above the interface between the opening for the locking pin and the clamping opening, in order to look the locking pin in its first position.

11. The tool fastening mechanism of claim 10, in which the tripping mechanism in its front edge contains a V-shaped notch, which takes at least one recess embodied in the lower end of the locking pin into engagement, in order to lock the locking pin in its first position.

12. The tool fastening mechanism of one of the foregoing claims, in which the clamping opening, in the plane of its orifice, has a trapezoidal cross section, whose length decreases in the direction of introduction of the shaft into the opening.

13. The tool fastening mechanism of claim 1, in which the cross section of the clamping opening is symmetrical in the plane of its orifice.

14. The tool fastening mechanism of claim 1, in which the clamping opening tapers systemically in the first direction.

15. The tool fastening mechanism of claim 1, in which the opening tapers symmetrically in the second direction.

16. The tool fastening mechanism of claim 1, in which the sides of the opening are flat.

17. The tool fastening mechanism of claim in which three protrusions are formed onto the tapering sides of the opening, specifically at least one on each tapering side, as a result of which in use, a contact at six points is brought about between the tool shaft and walls of the opening.

18. A tool for use with a fastening mechanism of claim 1, which has a shaft, whose sides taper inward toward a clamping end, and a locking pin engagement face, embodied on the tapering shaft part, which face is engaged in use by a locking pin of the fastening mechanism.

19. The tool of claim 18, in which a hole is formed by the tapering shaft part and is engaged in use by the locking pin of the fastening mechanism, a front edge of the hole forming the locking pin engagement face.

20. The tool of claim 19, in which the hole is oblong.

21. The tool of claim 18, further having three protrusions, which are distributed between the converging sides of the shaft, and in use the protrusions take the converging sides of a clamping recess of a fastening mechanism into engagement, in order to bring about a contact thereby at six main points.

* * * * *